US008795418B2

(12) United States Patent
Tabata et al.

(10) Patent No.: US 8,795,418 B2
(45) Date of Patent: Aug. 5, 2014

(54) ADSORPTIVE MEMBER AND APPARATUS USING THE SAME

(71) Applicant: Mitsubishi Plastics, Inc., Tokyo (JP)

(72) Inventors: Daiki Tabata, Shiga-ken (JP); Kumiko Okamoto, Kanagawa-ken (JP); Kouichirou Taniguchi, Shiga-ken (JP); Seiichi Kubokawa, Kanagawa-ken (JP)

(73) Assignee: Mitsubishi Plastics, Inc., Tokyo (JP)

( * ) Notice: Subject to any disclaimer, the term of this patent is extended or adjusted under 35 U.S.C. 154(b) by 138 days.

(21) Appl. No.: 13/657,109

(22) Filed: Oct. 22, 2012

(65) Prior Publication Data

US 2013/0089687 A1 Apr. 11, 2013

Related U.S. Application Data

(63) Continuation-in-part of application No. PCT/JP2011/058600, filed on Apr. 5, 2011.

(30) Foreign Application Priority Data

Apr. 22, 2010 (JP) ................................ 2010-098758

(51) Int. Cl.
*B01D 53/06* (2006.01)
*B01D 53/26* (2006.01)
*B01J 20/18* (2006.01)

(52) U.S. Cl.
USPC ................................ 96/125; 96/154; 427/386

(58) Field of Classification Search
USPC ............. 96/125, 154; 428/116, 413; 427/386; 252/194
See application file for complete search history.

(56) References Cited

U.S. PATENT DOCUMENTS

| | | | |
|---|---|---|---|
| 3,713,281 A * | 1/1973 | Asker et al. ..................... 96/154 |
| 5,580,370 A * | 12/1996 | Kuma et al. ...................... 96/154 |
| 5,733,451 A * | 3/1998 | Coellner et al. ............... 210/496 |
| 6,352,578 B1 * | 3/2002 | Sakata et al. ..................... 96/134 |
| 7,470,311 B2 * | 12/2008 | Sueoka et al. ................... 96/129 |
| 7,704,305 B2 * | 4/2010 | Nishida .......................... 96/154 |
| 8,664,154 B2 * | 3/2014 | Gadkaree et al. ............. 502/423 |
| 2005/0022671 A1 * | 2/2005 | Yamazaki et al. .............. 96/108 |
| 2006/0130652 A1 | 6/2006 | Takewaki et al. |

FOREIGN PATENT DOCUMENTS

| JP | 2004-136269 | 5/2004 |
| JP | 2007-190546 | 8/2007 |

OTHER PUBLICATIONS

International Search Report for PCT/JP2011/058600 Jun. 7, 2011.

* cited by examiner

*Primary Examiner* — Frank Lawrence
(74) *Attorney, Agent, or Firm* — Nixon & Vanderhye P.C.

(57) ABSTRACT

The present invention provides an adsorptive member which is used in a heat exchanger such as an adsorptive heat pump or a humidity control apparatus such as a desiccant system and which is excellent in heat resistance and adhesion between adsorptive particles and a base material. The adsorptive member comprising a base material and an adsorptive material layer formed on the base material,
  wherein the adsorptive material layer comprises adsorptive particles and a binder as essential components,
  and the binder is an epoxy cured product comprising the following structural units (a) and (b):
  (a): a bisphenol type structural unit; and
  (b): a linear hydrocarbon structural unit having 4 or more carbon atoms, and/or a polyalkylene ether structural unit having 3 or more ether oxygen atoms.

15 Claims, 1 Drawing Sheet

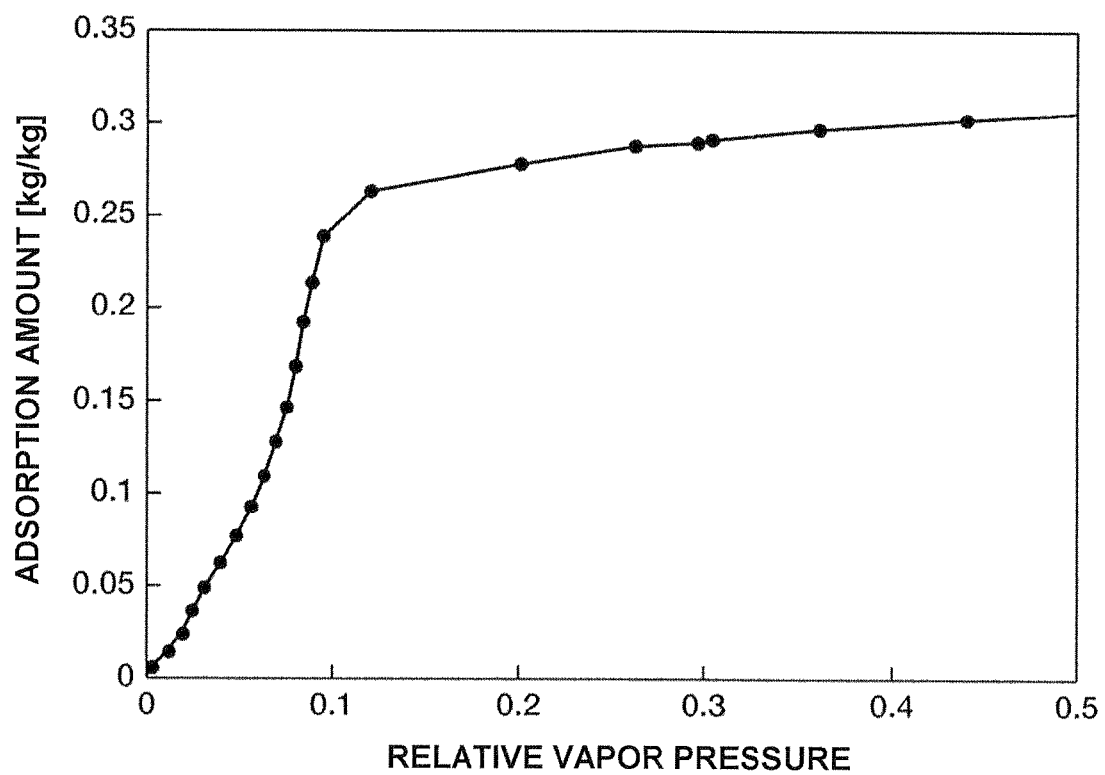

ADSORPTIVE MEMBER AND APPARATUS USING THE SAME

This application is a Continuation-In-Part of International Application No. PCT/JP2011/058600 filed Apr. 5, 2011 which designated the U.S. and claims priority to JP Patent Application No. 2010-098758 filed Apr. 22, 2010, the entire contents of each of which are hereby incorporated by reference.

TECHNICAL FIELD

The present invention relates to an adsorptive member and an apparatus using the adsorptive member, and more particularly, to an adsorptive member produced from adsorptive particles and a specific epoxy-based binder, and an apparatus using the adsorptive member such as a heat exchanger and a humidity control apparatus (humidistat), etc.

BACKGROUND ART

Hitherto, adsorptive particles such as zeolite, silica gel, activated carbon and mesoporous silica have been extensively used in various applications such as separation and purification of various gases, filters, adsorption heat pumps, catalysts, humidity control and deodorization. The adsorptive particles have been coated or supported together with a binder on an adequate base material and have been used in various configurations such as plates, tubes, honeycombs, sheets, nets and nonwoven fabrics.

For example, adsorptive heat pumps and desiccant systems are systems for heat transfer and humidity control using adsorption and desorption functions of adsorptive materials, and can be applied to various apparatuses utilizing a low-temperature exhaust heat from cogeneration systems such as cooling devices, heating and cooling apparatuses and humidity controllers. In the apparatuses using the adsorptive heat pumps, warm heat is produced by heat of adsorption in the module including the adsorptive material, whereas cold heat is produced by latent heat of vaporization in the vaporization module. Also, in the apparatuses using the desiccant systems, dehumidification is conducted in high-humidity seasons, whereas humidification is conducted in low-humidity seasons. Any of the apparatuses is effective for construction of comfortable spaces.

In recent years, in order to improve a performance of an adsorptive member used in an adsorption device of the above adsorptive heat pumps and desiccant systems and in order to reduce a size of these apparatuses, there have been made studies on the technique of applying an adsorptive material onto a heat exchanger or a honeycomb rotor.

For example, as a member for a heat exchanger of adsorption-type freezers, there may be used an adsorptive member obtained by directly applying an adsorptive material onto fins of the heat exchanger. More specifically, there has been proposed an adsorptive member obtained by applying an adhesive acrylic binder onto a plurality of aluminum fins, and bonding a powdery silica gel having a mesh size f 20 to 35 (particle diameter: about 450 to 850 μm) onto a surface of the acrylic binder (Patent Document 1). Also, there has been proposed the use of adsorptive particles such as zeolite, silica and alumina together with an inorganic binder such as colloidal silica, water glass and aluminum phosphate (Patent Documents 2 to 4). In addition, there has been proposed the use of these inorganic binders in combination with thermoplastic resins or cellulose-based organic binders (Patent Documents 5 and 6).

In addition, there has been proposed the use of zeolite or silica gel in combination with a resin binder having a glass transition temperature (Tg) of not lower than 35° C. (Patent Documents 7 and 8). More specifically, there has been proposed an adsorptive sheet using, as a binder, a cured product obtained by curing a bisphenol A-type epoxy resin by adding a curing agent thereto, or an adsorptive sheet using, as a binder, a high-molecular weight bisphenol A-type phenoxy resin without adding any curing agent thereto. Further, there has been proposed an adsorptive sheet using these binders in combination with a vinyl acetate resin, etc., to improve an adhesion property thereof. These resin binders may be used in the form of an aqueous emulsion in which water and the binder resin are subjected to phase separation, and therefore the aqueous phase is eliminated upon drying after coating the slurry, so that flowing paths of gases are formed around the respective adsorptive particles. For this reason, the resulting material can be enhanced in both of adhesion property and adsorption performance, so that it is possible to obtain an adsorptive member which is more excellent than the above binder.

On the other hand, with respect to the rotor-shaped adsorptive member which can be applied to desiccant systems, there has been proposed the use of a polyvinyl alcohol binder together with Y-type zeolite (Patent Document 9).

Meanwhile, with the recent development of a variety of heat sources which can be used in adsorptive heat pumps and desiccant systems as well as with the recent reduction in the size of these apparatuses, it has also been required that the adsorptive member used therein meets strict performance requirements. In particular, in the application field of warm heat production in adsorptive heat pumps in which a high temperature exceeding 120° C. tends to be used, it has been required that binders used therein are strictly controlled in their properties such as thermal stability and adhesion strength. For these reasons, at present, conventionally known adsorptive members have failed to satisfy these performance requirements.

For example, the binders formed of a bisphenol A type epoxy resin are relatively thermally stable, but fail to fully suppress a stress against a base material due to temperature change. Therefore, there tends to occur such a problem that a coating film produced therefrom is peeled off when subjected to heat cycle. Also, the high-molecular weight phenoxy resin in an uncured state can exhibit a sufficient flexibility but tends to be insufficient in adhesion property, and the phenoxy resin cured by adding a curing agent thereto can be improved in adhesion property but tends to be poor in flexibility. As a result, in any cases, the coating film produced from the phenoxy resin tends to suffer from the defects. Further, when using the above resin in combination with a vinyl acetate emulsion, etc., there tends to occur such a problem that the resulting binder has a poor heat resistance and therefore suffers from thermal decomposition and generation of outgases owing to the thermal decomposition which tends to result in deterioration of a vacuum degree inside of heat pumps. Also, the binder formed of polyvinyl alcohol tends to have a poor heat resistance and therefore tends to suffer from such a problem that a desiccant rotor using the binder by itself is deteriorated in heat resistance.

PRIOR ART DOCUMENTS

Patent Documents

Patent Document 1: Japanese Patent Application Laid-Open (KOKAI) No. 7-301469
Patent Document 2: Japanese Patent Application Laid-Open (KOKAI) No. 57-122950
Patent Document 3: Japanese Patent Application Laid-Open (KOKAI) No. 11-248389
Patent Document 4: Japanese Patent Application Laid-Open (KOKAI) No. 2004-313897
Patent Document 5: Japanese Patent Application Laid-Open (KOKAI) No. 2004-330095
Patent Document 6: Japanese Patent Application Laid-Open (KOKAI) No. 10-286460
Patent Document 7: Japanese Patent Application Laid-Open (KOKAI) No. 2007-190546
Patent Document 8: Japanese Patent Application Laid-Open (KOKAI) No. 2009-106799
Patent Document 9: Japanese Patent Application Laid-Open (KOKAI) No. 2004-268020

SUMMARY OF THE INVENTION

Problems to be Solved by the Invention

The present invention has been accomplished to solve the above problems. An object of the present invention is to provide an adsorptive member which is used in heat exchangers such as adsorptive heat pumps, humidity controlling apparatuses such as desiccant systems, or the like, and which is excellent in heat resistance and adhesion between adsorptive particles and a base material, as well as a heat exchanger or a humidity controlling apparatus to which the adsorptive member is applied.

Means for Solving the Problems

In order to solve the above problems, there have been proposed the method in which a cured product of a binder is improved in properties thereof by examining formulation of a curing agent therein, and the method in which a binder resin itself is improved in properties thereof. In the former method, there are present not only limited conditions concerning solubility in an aqueous slurry, pot life and rheology upon coating, but also a less number of curing agents applicable thereto owing to elution of unreacted compounds and volatilization or toxicity thereof. Therefore, in the present invention, the latter method is mainly adopted to improve properties of a binder and solve the problems with respect to an adsorptive member used in adsorptive heat pumps or desiccant rotors.

That is, in a first aspect of the present invention, there is provided an adsorptive member comprising a base material and an adsorptive material layer formed on the base material, wherein the adsorptive material layer comprises adsorptive particles and a binder as essential components, and the binder is an epoxy cured product comprising the following structural units (a) and (b):

(a): a bisphenol type structural unit; and
(b): a linear hydrocarbon structural unit having 4 or more carbon atoms, and/or a polyalkylene ether structural unit having 3 or more ether oxygen atoms.

In a second aspect of the present invention, there is provided a heat exchanger comprising the above adsorptive member.

In a third aspect of the present invention, there is provided an adsorptive heat pump comprising the above heat exchanger.

In a fourth aspect of the present invention, there is provided a warm water and/or cold water production apparatus comprising the above adsorptive heat pump.

In a fifth aspect of the present invention, there is provided a humidity control apparatus comprising the above adsorptive member.

Effect of the Invention

The adsorptive member according to the present invention is excellent in heat resistance, adsorption performance and durability, and therefore can be applied to adsorptive heat pumps and desiccant air conditioning systems, etc. In the adsorptive heat pumps, the temperature range in which the adsorptive heat pumps are used can be extended, so that it is possible to apply the adsorptive heat pumps to heat production apparatuses such as water heaters. Further, since the amount of outgases generated from the binder is very small, it is possible to design a small-size adsorptive heat pump equipped with no vacuum pump. In addition, in the desiccant air conditioning systems, it is possible to provide a desiccant element capable of being adapted to various heat sources.

BRIEF DESCRIPTION OF THE DRAWING

FIG. 1 is a graph showing a water vapor adsorption isotherm curve of ALPO-based zeolite "AQSOA-Z02" (tradename) produced by Mitsubishi Plastics, Inc., as adsorptive particles suitably used in the present invention.

PREFERRED EMBODIMENTS FOR CARRYING OUT THE INVENTION

The present invention is described in detail below.

First, the adsorptive member according to the present invention is described. The adsorptive member according to the present invention comprises a base material and an adsorptive material layer formed on the base material. The adsorptive material layer comprises adsorptive particles and a binder as essential components.

<Adsorptive Particles>

The adsorptive particles used in the present invention are not particularly limited as long as the particles can be used in the applications such as filters, adsorptive heat pumps, catalysts, humidity control and deodorization. Examples of the adsorptive particles include particles having an adsorption function such as particles of activated carbon, silica, mesoporous silica, alumina, zeolite, ion exchangers and polymeric adsorbers. In particular, from the viewpoint of good adsorption properties, preferred are particles of at least one material selected from the group consisting of zeolite, silica gel and mesoporous silica.

In the present invention, the adsorptive particles preferably have a moisture adsorption property and are regenerative by removal of the moisture therefrom upon heating, and more preferably generate heat upon adsorption of the moisture. For example, as the adsorptive particles, there are preferably used zeolites. The conventionally known zeolites may be used according to the applications thereof. Examples of the zeolites include beta-type zeolite, ferrierite-type zeolite, mordenite-type zeolite, L-type zeolite and Y-type zeolite. Also, as the zeolites capable of readily adsorbing a moisture and readily desorbing the moisture in a low temperature range, there are preferably used aluminosilicates and aluminophosphates. In particular, from the viewpoint of well controlling a structure and adsorption property of the zeolites, more preferred are crystalline aluminophosphates comprising at least Al and P in a skeletal structure thereof (hereinafter referred to as an "ALPO-based zeolite"). The ALPO-based zeolite may also include hetero atom-aluminophosphates formed by replacing a part of Al and/or P with the other atom (hetero atom: Me).

Also, in the present invention, the ALPO-based zeolite preferably has a change in adsorption of not less than 0.10 g/g when a change in relative vapor pressure is 0.15 in a relative vapor pressure range of not less than 0.01 and not more than 0.5 in a water vapor adsorption isotherm curve as measured at 25° C. The ALPO-based zeolite more preferably has a relative vapor pressure range in which the change in adsorption thereof is not less than 0.12 g/g and not more than 0.5 g/g.

Further, examples of the preferred skeletal structure of the ALPO-based zeolite used in the present invention include AEI, AEL, AET, AFI, AFN, AFR, AFS, AFT, AFX, ATO, ATS, CHA, ERI, LEV and VFI as defined by "The Structure Commission of the International Zeolite Association (IZA)". Among these structures, from the viewpoints of a good adsorption property and a good durability, preferred is at last one selected from the group consisting of AEI, AEL, AFI, CHA and LEV, and more preferred are a CHA structure and an AFI structure.

Among the above zeolites, the following aluminophosphates I) to III) are preferred from the viewpoint of a good adsorption property.

I) Me-aluminophosphate obtained by replacing a part of Al with a hetero atom Me1 (wherein Me1 represents at least one element selected from the group consisting of elements of 2A Group, 7A Group, 8 Group, 1B Group, 2B Group and 3B Group (except for Al) belonging to the third or fourth period in the Periodic Table);

II) Me-aluminophosphate obtained by replacing a part of P with a hetero atom Me2 (wherein Me2 represents an element of 4B Group belonging to the third or fourth period in the Periodic Table); and III) Me-aluminophosphate obtained by replacing both a part of Al and a part of P with the hetero atoms Me1 and Me2, respectively.

The ALPO-based zeolites may comprise one or more Me atoms. The Me atoms (Me1 and Me2) are preferably elements belonging to the third or fourth period in the Periodic Table. Me1 is preferably in a divalent ion state and has an ionic radius of not less than 0.3 Å and not more than 0.8 Å, and is more preferably in a divalent 4-coordinated state and has an ionic radius of not less than 0.4 Å and not more than 0.7 Å. Among the above elements for Me1, from the viewpoints of facilitated synthesis and a good adsorption property, preferred is at least one element selected from the group consisting of Fe, Co, Mg and Zn, and especially preferred is Fe. Also, the above elements as Me2 are 4B Group elements belonging to the third or fourth period of the Periodic Table, and preferred is Si.

The constitutional ratios (molar ratios) of Me, Al and P constituting the skeletal structure of the zeolites are usually in the ranges represented by the following formulae (1-1) to (3-1), respectively, and preferably in the ranges represented by the following formulae (1-2) to (3-2), respectively.

$$0 \leq x \leq 0.3 \qquad (1\text{-}1)$$

(wherein x represents a molar ratio of Me to a sum of Me, Al and P in the skeletal structure);

$$0.2 \leq y \leq 0.6 \qquad (2\text{-}1)$$

(wherein y represents a molar ratio of Al to a sum of Me, Al and P in the skeletal structure);

$$0.3 \leq z \leq 0.6 \qquad (3\text{-}1)$$

(wherein z represents a molar ratio of P to a sum of Me, Al and P in the skeletal structure);

$$0.01 \leq x \leq 0.3 \qquad (1\text{-}2)$$

(wherein x represents a molar ratio of Me to a sum of Me, Al and P in the skeletal structure);

$$0.3 \leq y \leq 0.5 \qquad (2\text{-}2)$$

(wherein y represents a molar ratio of Al to a sum of Me, Al and P in the skeletal structure); and $$0.4 \leq z \leq 0.5 \qquad (3\text{-}2)$$

(wherein z represents a molar ratio of P to a sum of Me, Al and P in the skeletal structure).

When x is less than the above-specified range, the amount of the adsorbate which is adsorbed to zeolites tends to be reduced in the range where a pressure of an adsorbate is low, or it may be difficult to synthesize the zeolites as desired. When x is more than the above-specified range, impurities tend to be included in the zeolites upon synthesis thereof. In addition, when y and z are out of the above specified ranges, it may be difficult to synthesize the zeolites as desired.

Also, the ALPO-based zeolites used in the present invention usually have a framework density (FD) of not less than 13 T/nm$^3$, preferably not less than 13.5 T/nm$^3$, and more preferably not less than 14 T/nm$^3$. On the other hand, the framework density (FD) of the ALPO-based zeolites is usually not more than 20 T/nm$^3$, and preferably not more than 19 T/nm$^3$. The unit "T/nm$^3$" as used herein means T atoms per a unit volume nm$^3$ (i.e., the number of elements except for oxygen constituting a skeleton per 1 nm$^3$ of zeolite), and is a unit represented by FD. When FD is less than the above lower limit, the structure of the zeolites tends to be unstable, thereby causing the problem of deteriorated durability. On the other hand, when FD is more than the above upper limit, the zeolites tend to be deteriorated in adsorption capacity and therefore tend to be unsuitable for use thereof as an adsorptive material.

Specific examples of the ALPO-based zeolites having the FD within the above-specified range include SAPO-34, FAPO-5 and ALPO-5. These ALPO-based zeolites may be produced by the conventionally known synthesis methods as described, for example, in Japanese Patent Publication (KOKOKU) No. 1-57041 and Japanese Patent Application Laid-Open (KOKAI) Nos. 2003-183020 and 2004-136269, etc. These adsorptive materials may be used alone or in combination of any two or more thereof.

The size of the adsorptive particles is preferably small from the viewpoints of increasing a surface area of the adsorptive particles and enhancing an adsorption/desorption capability thereof. However, when the size of the adsorptive particles is excessively smaller than a particle diameter of dispersed binder particles in the binder emulsion, coating of a surface of the respective adsorptive particles with the binder as well as lack of the binder owing to increase in surface area of the adsorptive particles tend to be caused, so that the resulting adsorptive member tend to be deteriorated in adsorption performance and durability. Since the particle diameter of dispersed binder particles in the emulsion is usually not more than 10 μm, the average particle diameter of the adsorptive particles is usually 0.1 to 300 μm, preferably 0.5 to 250 μm, more preferably 1 to 200 μm and most preferably 2 to 20 μm. Meanwhile, the average particle diameter of the ALPO-based zeolites as used herein means a particle diameter D50 corresponding to a weight ratio of 50%.

The adsorptive particles are usually used in an amount of 60 to 95% by weight and preferably 80 to 95% by weight in terms of a dried weight based on 100% by weight as a total amount of the resulting coating film comprising the adsorptive particles from the viewpoints of impart a sufficient adsorption performance to the resulting adsorptive member.

<Binder>

In the present invention, it is essential that the following specific epoxy cured product is used as the binder in the adsorptive material layer. The above binder may also be used in combination with the other binder. For example, the epoxy cured product may be used in combination with organic binders such as phenoxy resins or inorganic binders such as silica sol. The specific epoxy cured product used as the essential binder component is characterized by comprising the following structural units (a) and (b).

(a): A bisphenol type structural unit; and (b): A linear hydrocarbon structural unit having 4 or more carbon atoms, and/or a polyalkylene ether structural unit having 3 or more ether oxygen atoms.

The above epoxy cured product may be used in the form of a mixture of any two or more kinds thereof. In addition, the respective structural units (a) and (b) may also be used in combination of any two or more thereof.

The epoxy cured product used in the present invention may have a high glass transition temperature (Tg) from the viewpoint of good heat resistance and less generation of outgases. However, when Tg is excessively high, the resulting coating film may fail to suppress an internal stress and therefore tends to suffer from occurrence of cracks and peeling. For this reason, the Tg of the epoxy cured product suitably lies within the temperature range upon use of the adsorptive member. The suitable Tg is generally 20 to 120° C., preferably 35 to 120° C. and more preferably 60 to 110° C.

Examples of the above bisphenol type structural unit include structural units derived from bisphenol A, bisphenol F and bisphenol S. More specifically, there may be mentioned the units removing a terminal OH group from these compounds and the unit represented by the following general formula (1). In addition, the ring(s) in these structural units may be hydrogenated. Further, the rings in these structural units may be substituted with a substituent group such as a hydrocarbon group, an alkoxyl group, an aryl group, an aryloxy group, a hydroxyl group, etc.

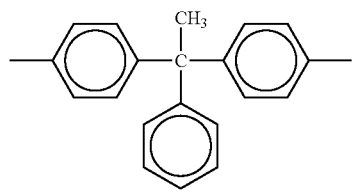

(1)

It is required that the above linear hydrocarbon structural unit having 4 or more carbon atoms or the above polyalkylene ether structural unit is present in the epoxy cured product separately from the above bisphenol type structural unit. Among these structural units, the linear hydrocarbon structural unit having 4 or more carbon atoms is a structural unit represented by the formula: —$(CH_2)_x$— in which x is a number of 4 or more. The suffix x is preferably 4 to 20, and more preferably 4 to 10. Meanwhile, any of hydrogen atoms of the hydrocarbon structural unit may be substituted with a substituent group such as a hydroxyl group. Further, there may be used the hydrocarbon structural units replacing at least one hydrogen atom in that formula with a hydrocarbon group, an alkoxyl group, an aryl group, an aryloxy group, etc. The hydrocarbon group and the alkoxyl group as the substituent group preferably have 4 or more carbon atoms. The aryl group in the aryl group or the aryloxy group is preferably a phenyl group. These substituent groups may be present in the linear hydrocarbon structural unit to such an extent that they do not adversely affect a flexibility of the structural unit (b).

In addition, the polyalkylene ether structural unit has the number of ether oxygen atoms of not less than 3, preferably 3 to 20 and more preferably 3 to 10. More specifically, as the polyalkylene ether structural unit, there may be mentioned those structural units derived from polymers of at least one alkyleneoxide selected from the group consisting of ethyleneoxide, propyleneoxide, butyleneoxide, isobutyleneoxide, neopentyleneoxide, tetramethyleneoxide and the like. In addition, at least one hydrogen atom in these alkyleneoxides may be substituted with a substituent group such as, for example, a hydroxyl group, an alkoxyl group, an aryl group, an aryloxy group and a hydrocarbon group. The hydrocarbon group and the alkoxyl group as the substituent group preferably has not more than 4 carbon atoms, and the aryl group included in the aryl group and the aryloxy group is preferably a phenyl group. These substituent groups may be included in the polyalkylene ether structural unit unless they adversely affect a flexibility of the structural unit (b).

The linear hydrocarbon structural unit having 4 or more carbon atoms serves for providing a cured product having a high heat resistance, whereas the polyalkylene ether structural unit serves for improving an adhesion property or a bonding property to, for example, metal base materials. By appropriately selecting these structural units, it is possible to adapt to various base materials and production processes as well as to meet various performance requirements.

In the present invention, the molar ratio of the structural unit (a) to the structural unit (b) is preferably from 10:1 to 1:5, and more preferably from 5:1 to 1:3. When the proportion of the structural unit (a) is more than the above-specified range, the resulting epoxy cured product tends to fail to exhibit a sufficient flexibility, so that it may be difficult to reduce a thermal stress of the adsorptive member to a sufficient extent, which tends to result in occurrence of cracks or peeling in the adsorptive material layer. On the other hand, when the proportion of the structural unit (a) is less than the above-specified range, the Tg of the resulting epoxy cured product tends to be excessively low and therefore tends to be deteriorated in heat resistance.

Meanwhile, as the method imparting a flexibility to epoxy resins, there are known the method of blending an elastomer or a thermoplastic elastic material such as carboxyl group-terminated butadiene-acrylonitrile copolymers (CTBN) in epoxy resins, or the method of reacting a bisphenol type epoxy resin with an aliphatic dicarboxylic acid such as a dimer acid and sebacic acid as a molecular chain extender, etc. However, these methods are unsuitable for production of adsorptive members which are subjected to repeated adsorption and desorption of water vapor upon use, because the resulting products tend to be deteriorated in heat resistance owing to hydrolysis of an ester bond, etc.

More specifically, the epoxy cured product used in the present invention preferably has at least one structure selected from those structures represented by the following structural formulae (2-i) to (2-iv). In addition, a plurality of hydroxyl groups in the following structural formulae may be subjected to crosslinking reaction to thereby allow an oxygen atom in the respective hydroxyl groups to bond to an unspecified structure.

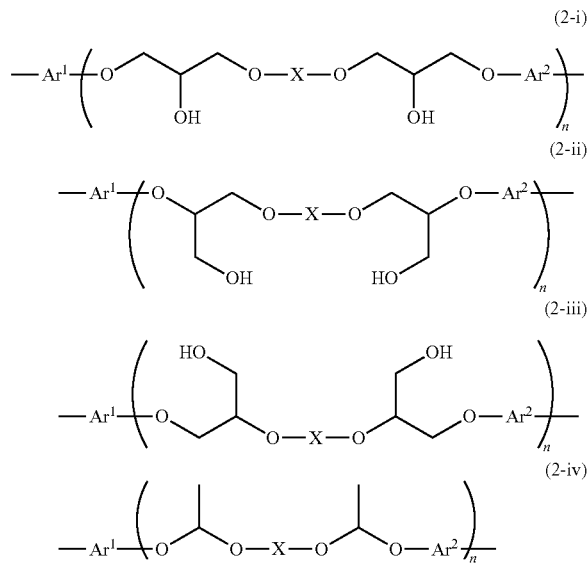

In the structural formulae (2-i) to (2-iv), $Ar^1$ and $Ar^2$ are respectively a bisphenol type structural unit (a) which may be the same or different from each other, may be hydrogenated or may have a substituent group; X is a linear hydrocarbon structural unit having 4 or more carbon atoms and/or a polyalkylene ether structural unit having 1 or more ether oxygen atoms. When X is a linear hydrocarbon structural unit having 4 or more carbon atoms, X constitutes the structural unit (b), whereas when X is a polyalkylene ether structural unit having 1 or more ether oxygen atoms, —O—X—O— having the ether oxygen atoms at both terminal ends thereof constitutes the structural unit (b). Also, n represents an average value of repeating units, and is a number of 1 to 30.

Such an epoxy cured product may be produced by the method of curing a given epoxy resin by adding a curing agent thereto.

As the epoxy resin, there may be used an epoxy resin having the above structural units (a) and (b), combination of an epoxy resin having at least one of the following structural units (a) and (b) and an epoxy resin having at least the other structural unit, or combination of an epoxy resin having the following structural unit (a) and a chain extender capable of adding the structural unit (b) to the epoxy resin by the reaction with the epoxy resin.

Examples of the epoxy resins having the structures represented by the above structural formulae include "EPICLON EXA4816" and "EPICLON EXA4822" (tradenames) both produced by DIC Corp., and "YL7175-500" and "YL7175-1000" (tradenames) both produced by Mitsubishi Chemical Corporation.

The epoxy resin may be used in the form of a solution in an organic solvent, but is preferably used in the form of an aqueous emulsion. The binder may be usually used in an amount of 5 to 40 parts by weight and is preferably 5 to 20 parts by weight in terms of a dried weight based on 100 parts by weight of the adsorptive particles. When using the epoxy cured product as the essential binder component in combination with the other binder, the amount of the other binder used is usually not more than 60 parts by weight and preferably not more than 50 parts by weight based on 100 parts by weight of the essential binder component.

<Curing Agent>

Examples of the curing agent used for curing the above epoxy resin include amine-based compounds, acid anhydrides, phenol-based compounds, imidazole compounds and latent curing agents, etc.

Specific examples of the amine-based compounds include aliphatic polyamines such as ethylenediamine, propylenediamine, butylenediamine, hexamethylenediamine, diethylenetriamine, triethylenetetramine and pentaethylenehexamine; aromatic polyamines such as meta-xylylenediamine, diaminodiphenylmethane and phenylenediamine; alicyclic polyamines such as 1,3-bis(aminomethyl)cyclohexane, isophorone diamine and norbornane diamine; and dicyandiamide (DICY) and polyamide resins synthesized from a dimer of linolenic acid and ethylenediamine, etc.

Specific examples of the acid anhydrides include phthalic anhydride, trimellitic anhydride, pyromellitic anhydride, maleic anhydride, tetrahydrophthalic anhydride, methyltetrahydrophthalic anhydride, methylnadic anhydride, hexahydrophthalic anhydride and methylhexahydrophthalic anhydride, etc.

Specific examples of the phenol-based compounds include phenol novolak resins, cresol novolak resins, aromatic hydrocarbon formaldehyde resin-modified phenol resins, dicyclopentadiene phenol-added type resins, phenol aralkyl resins, naphthol aralkyl resins, trimethylol methane resins, tetraphenylol ethane resins, naphthol novolak resins, naphthol-phenol co-polycondensed novolak resins, naphthol-cresol co-polycondensed novolak resins, biphenyl-modified phenol resins, aminotriazine-modified phenol resins and modified products of these resins, etc.

Specific examples of the imidazole compounds include 2-methyl imidazole, 2-ethyl imidazole, 4-methyl imidazole, 4-ethyl imidazole, 2-phenyl imidazole, 2-phenyl-4-methyl imidazole, 2-phenyl-4-hydroxymethyl imidazole, 2-ethyl-4-methyl imidazole, 1-cyanoethyl-2-methyl imidazole, 2-phenyl-4-methyl-5-hydroxymethyl imidazole and 2-phenyl-4,5-dihydroxymethyl imidazole, etc.

Specific examples of the latent curing agents include Lewis acid complexes such as $BF_3$-amine complex, dicyandiamide, imidazole modified products, organic acid hydrazides, DCMU and amine imide compounds, etc as well as capsule-type latent curing agents encapsulating a curing agent in a microcapsule.

Also, the above curing agents may be used in the form of a mixture of any two or more thereof. The amount of the respective curing agents used is usually 1 to 20 parts by weight and preferably 3 to 15 parts by weight based on 100 parts by weight of the binder resin.

<Curing Accelerator>

In the present invention, in addition to the curing agent, there may be further used a curing accelerator. The curing accelerator used in the present invention is not particularly limited. Examples of the curing accelerator include imidazole compounds, tertiary amine compounds and organic phosphorus-based compounds, etc.

Specific examples of the imidazole compounds include 2-methyl imidazole, 2-ethyl imidazole, 4-methyl imidazole, 4-ethyl imidazole, 2-phenyl imidazole, 2-phenyl-4-methyl imidazole, 2-phenyl-4-hydroxymethyl imidazole, 2-ethyl-4-methyl imidazole, 1-cyanoethyl-2-methyl imidazole, 2-phenyl-4-methyl-5-hydroxymethyl imidazole and 2-phenyl-4,5-dihydroxymethyl imidazole.

Specific examples of the tertiary amine compounds include amine compounds having an alkyl group or an aralkyl group as a substituent group bonded to a nitrogen atom such as triethylamine, benzyldimethylamine, benzyltrimethylamine and α-methylbenzyldimethylamine, etc.; cycloamidine compounds such as 1,8-diaza-bicyclo[5.4.0]undecene-7 and phenol salts, octylic acid salts and oleic acid salts thereof as well as organic acid salts of these cycloamidine compounds, and salts or complex salts of the cycloamidine compound and a quaternary boron compound, etc.

Specific examples of the organic phosphorus-based compounds include triorganophosphine compounds such as triphenyl phosphine, tributyl phosphine, tri(p-methylphenyl) phosphine, tri(nonylphenyl)phosphine, triphenyl phosphine.triphenyl borane; and quaternary phosphonium salts such as tetraphenyl phosphonium.tetraphenyl borate.

The amount of the curing accelerator used is usually 1 to 30 parts by weight and preferably 5 to 20 parts by weight based on 100 parts by weight of the curing agent.

In addition, as the latent curing accelerator, there may also be used known curing accelerators such as quaternary salts of the above imidazole compounds and the compositions as described in Japanese Patent Application Laid-Open (KOKAI) No. 2002-3576.

<Diluent>

In the present invention, upon producing the epoxy cured product as the essential binder component, a diluent may be used as a viscosity controller or a chain extender. From the viewpoints of preventing elution or occurrence of outgases, there are preferably used those diluents which are capable of reacting with epoxy resins, and especially preferably those diluents having two or more functional groups which are reactive with epoxy resins. Examples of the functional groups include an amino group, a mercapto group, a carboxyl group, a hydroxyl group, an epoxy group and an acid anhydride group. In particular, those diluents having a long chain structure in a molecule thereof are preferred because they have the effect of imparting a good flexibility to the resulting cured product. Examples of the long chain structure in the diluent include an aliphatic group such as an alkylene group comprising a linear portion having 4 or more carbon atoms, an alkylene ether group comprising a linear portion having 2 or more carbon atoms, and a polyether group comprising two or more alkyleneoxy group repeating units in a linear portion thereof. Specific examples of commercially available products of the epoxy group-containing diluents include "YED205", "YED216M" and "YED216D" all produced by Mitsubishi Chemical Corporation. Specific examples of commercially available products of the amino group-containing diluents include "JEFFAMINE D-230", "D-400" and "D-2000" all produced by Mitsui Fine Chemicals, Inc. In particular, as described above, when using the epoxy resin having the structural unit (a) only as the epoxy resin of the present invention, it is required that the epoxy resin is used in combination with the chain extender capable of adding the structural unit (b) to the epoxy resin by the reaction therewith. In addition, when adding such a reactive diluent, there tends to arise the problems such as elution or volatilization of unreacted compounds. Therefore, from the viewpoint of reducing the unreacted compounds, the amount of the diluent added is preferably less than a theoretical equivalent ratio thereof. The amount of the diluent used is usually 5 to 30 parts by weight and preferably 10 to 20 parts by weight based on 100 parts by weight of the binder resin.

<Solvent>

In the present invention, when forming the adsorptive material layer on the base material, there is preferably used the method of applying a slurry comprising the adsorptive particles and the binder onto the base material. For this reason, the binder is preferably used in the form of an aqueous emulsion. In order to emulsify the binder, a solvent other than water may also be added thereto for the purposes of viscosity control or the like. The kind and amount of solvent added are not particularly limited, and the solvent is preferably selected from those solvents which hardly remain in the resulting cured product. The solvent is usually used in an amount of 5 to 30 parts by weight and preferably 10 to 20 parts by weight based on 100 parts by weight of the binder.

<Other Additives>

In the present invention, in order to improve a thermal conductivity of the adsorptive material layer comprising the adsorptive particles as a whole, there may be used various additives having a good thermal conductivity, e.g., fibrous substances such as metal fibers and carbon fibers, metal powders such as powders of aluminum, copper and silver, graphite, carbon black, carbon nanotubes, aluminum nitride and boron nitride. In addition, in order to increase a strength of the coating layer, there may also be used kaolin, acicular calcium silicate, acicular zinc oxide, sepiolite, acicular calcium carbonate, calcium titanate, aluminum borate and acicular basic magnesium sulfate. The amount of the additives used is usually 0.5 to 30 parts by weight and preferably 1 to 20 parts by weight based on 100 parts by weight of the adsorptive particles.

In the present invention, by using the binder having the above specific structure, it is possible to enhance adhesion between the adsorptive materials as well as adhesion between the adsorptive material and the base material over an extensive temperature range, and support a much larger amount of the adsorptive material having a smaller particle diameter on the base material, and further attain an excellent effect of enhancing a heat resistance, a water resistance and an adhesion property as well as improving a long-term stability.

<Base Material>

The material and shape of the base material used in the present invention are not particularly limited. In particular, when the adsorptive particles and the binder are used in the form of an aqueous dispersion (aqueous slurry), it is possible to adhere and fix the adsorptive particles onto the base material having a complicated shape. Therefore, in the case of the aqueous dispersion, various base materials may be selectively used according to the applications or functions required.

Examples of a shape of the base material include at least one shape selected from the group consisting of a plate, a tube, a honeycomb, a net and a nonwoven fabric. These shapes of the base material may be appropriately selected according to the applications or functions required.

Examples of a raw material of the base material include papers, natural resins, synthetic resins, metals, ceramic materials and inorganic fibers. Among these materials, especially preferred is at least one material selected from the group consisting of metals, ceramic materials and inorganic fibers.

The base material used for adsorptive heat pumps may include heat exchangers. From the viewpoints of a good thermal conductivity, a high strength and low costs, heat exchangers formed of metals are preferred, and there may be used various conventionally known heat exchangers. These heat exchangers may be subjected to primer treatment for the purposes of improving an anticorrosion property and a wetting property, etc. In addition, fin materials flock-finished with inorganic fibers, etc., are also preferably used from the viewpoint of a good adsorption and desorption efficiency.

As the base material used for desiccant elements such as desiccant rotors, those having a light weight and a good heat resistance are preferably used. Specific examples of the base material used for desiccant elements include honeycomb-shaped materials obtained by forming a nonwoven fabric formed of various heat-resistant fibers or a heat-resistant resin sheet into a honeycomb shape. From the viewpoint of a good adsorption and desorption efficiency, these honeycombs preferably have a large cell density.

The method of producing the adsorptive member of the present invention is not particularly limited. More specifically, there is preferably used the method in which a slurry comprising at least an aqueous emulsion of the adsorptive particles and the above epoxy resin and the curing agent is coated onto the base material, and then the slurry thus coated is dried and cured to form an adsorptive material layer.

Examples of the coating method include a dip (impregnation or immersion) coating method, a spray coating method, a knife coating method, a roll knife coating method, a gravure coating method, a roll coating method, a blade coating method, a rod coating method, an air doctor coating method, a curtain flow coating method, a spin coating method, a cast coating method, an electro-deposition coating method, a screen printing method, a pad printing method and an offset printing method.

When applying the slurry onto the base material having a complicated shape such as heat exchangers, among these coating methods, there are preferably used a curtain flow coating method, a spray coating method and an electro-deposition coating method. When applying the slurry onto the base material having a non-complicated and relatively simple shape such as sheets, there may be suitably used any of the above coating methods. However, from the viewpoint of a good productivity, preferred are a spray coating method, a knife coating method, a roll knife coating method, a gravure coating method, a roll coating method, a blade coating method, a rod coating method, an air doctor coating method, a screen printing method, a pad printing method and an offset printing method.

In particular, when applying the slurry onto sheets, the slurry may be applied on either one surface or both surfaces thereof. Also, different kinds of adsorptive material layers may be provided on the front and rear surfaces of the sheet, respectively. Further, an intermittent coating method or a stripe coating method may also be used, and the kinds of adsorptive material layers may vary according to respective portions of the base material to be coated.

The drying and curing conditions after coating are not particularly limited, and may be appropriately selected in view of kinds of epoxy resins and curing agents used, thickness of the coating layer, etc.

In addition, the thickness of the adsorptive material layer formed on the base material may be appropriately determined in view of adsorption performance, costs and efficiency. In general, the thickness of the adsorptive material layer is preferably 10 to 1000 μm and more preferably 30 to 800 μm. In the application field of heat exchangers for adsorptive heat pumps in which adsorption and desorption operations are conducted under vacuum conditions, the thickness of the adsorptive material layer has a less influence on diffusion of an adsorbate thereover. For this reason, in order to increase an adsorption capacity of the adsorptive material layer, the thickness of the layer tends to be increased. That is, the thickness of the adsorptive material layer used for the adsorptive heat pumps is 100 to 1000 μm and especially preferably 100 to 500 μm. In the desiccant air conditioning systems in which adsorption and desorption operations are conducted under wind-blowing atmospheric pressure, the thickness of the adsorptive material layer used therein tends to be small as compared to that used for the adsorptive heat pumps. In the case of the honeycomb-shaped adsorptive member, it may be more effective to increase a cell density of the honeycomb for increasing a contact area of the honeycomb-shaped adsorptive member with air rather than reducing a thickness of the adsorptive material layer. When ordinary desiccant rotors have a cell density of 150 to 500 cells/in$^2$, the thickness of the adsorptive material layer is 10 to 200 μm. When applying the adsorptive material onto the honeycomb-shaped base material, it may be difficult from the industrial viewpoints to form an adsorptive material layer having a large thickness. Therefore, the thickness of the adsorptive material layer in such a case is 10 to 100 μm. When applying the adsorptive material to a nonwoven fabric, a metal foil or a thin film and then forming the resulting coated material into a honeycomb shape or a corrugated shape, the thickness of the adsorptive material layer is 30 to 200 μm.

In the adsorptive member of the present invention, the adsorptive material layer has a pencil hardness of not less than 4H at 20° C., less than 4H at 100° C. and not less than 6B at 150° C. That is, the adsorptive material layer has a high hardness at an ordinary temperature and exhibits a sufficient softness at 100° C. Therefore, when the adsorptive member of the present invention is used in the applications such as heat exchangers, the adsorptive material layer is kept in a firm state on the low-temperature side of a heat cycle, and exhibits a softened state on the high-temperature side thereof, so that it is possible to reduce a thermal stress exerted on the adsorptive material layer. As a result, the adsorptive material layer can hardly suffer from occurrence of defects when subjected to the heat cycle.

Also, the epoxy cured product as the binder can maintain a constant cohesive force and is hardly fluidized even at a temperature of 150° C. Therefore, the adsorptive member is free from such a problem that the adsorptive particles are covered with the fluidized binder whereby the adsorptive member is deteriorated in adsorption performance.

That is, the pencil hardness of the adsorptive material layer is preferably in the above-specified range from the viewpoints of keeping a strength and an adsorption performance of the layer.

Meanwhile, the pencil hardness as described in the present invention means the value as measured by the same method as prescribed in JIS K5600-5-4 except for a measuring temperature used therein. In the present invention, three measuring temperatures including 20° C., 100° C. and 150° C. were used in which the temperature condition upon the measurement was set to ±2° C. of the respective measuring temperatures while actually measuring the temperature of the layer. The measurement of the pencil hardness was carried out using a pencil "Uni" (tradename) produced by Mitsubishi Pencil Co., Ltd., in the range of 4H to 6B. When no defects were observed at a hardness of 4H, the layer was evaluated as being "not less than 4H", whereas when defects were observed even at a hardness of 6B, the layer was evaluated as being "less than 6B".

Thus, the adsorptive member of the present invention is preferably applied to heat exchangers.

Also, when using the heat exchangers as desiccant elements, there may be used various conventionally known heat exchangers similarly to the case of the adsorptive heat pumps. Meanwhile, as an example of an apparatus using the adsorptive heat pumps, there may be mentioned warm water or cold water production apparatuses.

In the present invention, the thickness and weight of the layer comprising the adsorptive particles which to be provided on the base material may be appropriately determined in view of adsorption performance, costs and efficiency.

EXAMPLES

The present invention is more specifically described below by referring to Examples and Comparative Examples. However, these Examples are only illustrative and not intended to limit the present invention thereto, and various modifications and changes are involved in the scope of the present invention unless they depart therefrom.

Example 1

Preparation of Binder Emulsion

There was used an epoxy resin "EPICLON EXA4816" (tradename) produced by DIC Corp., comprising a bisphenol A skeleton as a structural unit (a) and a linear hydrocarbon having 6 carbon atoms as a structural unit (b). While stirring a mixed liquid comprising 400 g of the above epoxy resin and 40 g of "ANTOX PX-80" (tradename) produced by Nippon Nyukazai Co., Ltd., at 70° C. using a homogenizer, ion-exchanged water maintained at 70° C. was added little by little thereto to obtain an aqueous emulsion having a solid content of 42% by weight. The particles emulsified in the emulsion had an average particle diameter of 0.7 µm.

<Preparation of Slurry Comprising Adsorptive Particles>

As the adsorptive particles, there was used a zeolite "AQSOA-Z02" (tradename) produced by Mitsubishi Plastics, Inc., as a silicoaluminophosphate having a particle diameter of 5 µm and a CHA structure. The water vapor adsorption isotherm curve of the zeolite as measured at 25° C. is shown in FIG. 1.

Also, as the rheological additive, there was used a powdery sepiolite produced by Omi-Mining Co., Ltd.

The above zeolite and the above rheological additive were weighed in amounts of 10 g and 0.1 g, respectively, in a glass bottle, and fully dry-blended with each other. Successively, 12 g of ion-exchanged water were charged into the glass bottle, and the contents of the glass bottle were stirred and then cooled to an ordinary temperature. If any water was evaporated by heat of adsorption, ion-exchanged water was further added by an amount corresponding to the amount of water evaporated to thereby adjust an amount of water in the glass bottle to 12 g. Further, 0.1 g of dicyandiamide (DICY) as a curing agent and 2.4 g of the above binder emulsion (solid content: 1 g) were added, and the resulting mixture was continuously stirred until DICY was dissolved, thereby obtaining a slurry having a solid content of 45% by weight.

<Preparation of Test Piece>

After adding dropwise 1.45 g of the above slurry onto an aluminum plate (base material) having a width of 25 mm, a length of 80 mm and a thickness of 1 mm, the slurry was spread over a whole portion of one surface of the aluminum plate, and the thus coated aluminum plate was placed and dried on a horizontal hot plate maintained at 70° C., and the coating material was further dried on a hot plate maintained at 120° C. for 30 min and successively cured in an oven maintained at 180° C. for 3 h. As a result, a coating film having an average thickness of about 500 µm was formed on the surface of the aluminum plate. As a result of DSC measurement, it was confirmed that the resulting cured product had a glass transition temperature Tg of 79° C.

Example 2

The same procedure as defined in Example 1 was conducted except that "EPICLON EXA4822" (tradename) produced by DIC Corp., (comprising a bisphenol A skeleton as a structural unit (a) and a polyethylene glycol having 4 ether oxygen atoms as a structural unit (b)) was used as the epoxy resin, thereby preparing a binder emulsion (average particle diameter: 0.8 µm) and a slurry, and further preparing a test piece (average coating film thickness: about 500 µm) using the slurry. As a result of subjecting the resulting cured product to DSC measurement, it was confirmed that the cured product had a glass transition temperature Tg of 82° C.

Example 3

The same procedure as defined in Example 1 was conducted except that 10% by weight of the epoxy resin used in Example 1 was replaced with a reactive diluent "YED216D" (tradename) produced by Mitsubishi Chemical Corporation, (linear hydrocarbon having 6 carbon atoms which includes a glycidyl ether group at both terminal ends thereof), thereby preparing a binder emulsion (average particle diameter: 0.7 µm) and a slurry, and further preparing a test piece (average coating film thickness: about 490 µm) using the slurry. As a result of subjecting the resulting cured product to DSC measurement, it was confirmed that the cured product had a glass transition temperature Tg of 63° C.

Example 4

Using the Emulsion of Example 1 in Combination with the Emulsion Described in the Above Patent Document 7

The same procedure as defined in Example 1 was conducted except that the following two kinds of emulsions (i) and (ii) were used in an amount of 0.5 g for each in terms of a solid content, thereby preparing a binder emulsion (average particle diameter: 0.7 µm) and a slurry, and further preparing a test piece (average coating film thickness: about 500 µm) using the slurry. As a result of subjecting the resulting cured product to DSC measurement, it was confirmed that the cured product had glass transition temperatures Tg of 80° C. and 99° C.

(i) The binder emulsion prepared in Example 1 (solid content: 42% by weight; average particle diameter: 0.7 µm)

(ii) "YL7162P" (tradename; produced by Mitsubishi Chemical Corporation; solid content: 45% by weight; average particle diameter: 0.5 µm) as an emulsion of a phenoxy type epoxy resin "JER1256" (tradename; produced by Mitsubishi Chemical Corporation; comprising a bisphenol A skeleton as a structural unit (a) and no structural unit (b) and having an epoxy group at both terminal ends thereof; molecular weight: about 50000).

Example 5

The same procedure as defined in Example 1 was conducted except that "YL7175-500" (tradename) produced by Mitsubishi Chemical Corporation, (comprising a bisphenol F skeleton as a structural unit (a) and a linear hydrocarbon having 6 carbon atoms as a structural unit (b)) was used as the epoxy resin, thereby preparing a binder emulsion (average particle diameter: 0.6 µm) and a slurry, and further preparing a test piece (average coating film thickness: about 500 µm) using the slurry. As a result of subjecting the resulting cured product to DSC measurement, it was confirmed that the cured product had a glass transition temperature Tg of 33° C.

Comparative Example 1

Using the Emulsion Described in the Patent Document 7

The same procedure as defined in Example 1 was conducted except that "YL7162P" (tradename) produced by Mitsubishi Chemical Corporation, was used as the binder emulsion, thereby preparing a test piece (average coating film thickness: about 460 μm). As a result of subjecting the resulting cured product to DSC measurement, it was confirmed that the cured product had a glass transition temperature Tg of 98° C.

Comparative Example 2

Using the Emulsion Described in Patent Document 7 without any Curing Agent

The same procedure as defined in Example 1 was conducted except that "YL7162P" (tradename) produced by Mitsubishi Chemical Corporation, was used as the binder emulsion, and no DICY as a curing agent was added, thereby preparing a test piece (average coating film thickness: about 470 μm). As a result of subjecting the resulting cured product to DSC measurement, it was confirmed that the cured product had a glass transition temperature Tg of 52° C.

Comparative Example 3

The same procedure as defined in Example 1 was conducted except that "YL7410" (tradename) produced by Mitsubishi Chemical Corporation, (comprising no structural unit (a) and a polyether chain as a structural unit (b)) was used as the epoxy resin, thereby preparing a binder emulsion (average particle diameter: 0.7 μm) and a slurry, and further preparing a test piece (average coating film thickness: about 450 μm) using the slurry. As a result of subjecting the resulting cured product to DSC measurement, it was confirmed that the cured product had a glass transition temperature Tg of −40° C.

The test pieces prepared above in Examples 1 to 5 and Comparative Examples 1 to 3 were subjected to evaluation of the following performances. The results are shown in Table 1.

<Evaluation for Durability of Coating Film>

The obtained test piece was subjected to durability test for 200 cycles in which each cycle comprises a series of operations including drying the test piece by warm air at 150° C. for 5 min and then before 3 sec elapsed from completion of the drying, immersing the test piece in ion-exchanged water maintained at a temperature of 23 to 26° C. for 1 min. The results were evaluated according to the following ratings.

◯: No defects of the coating film (floating, cracks or peeling) occurred even after 200 cycles.

x: Defects of the coating film (floating, cracks or peeling) occurred after 200 cycles.

<Evaluation for Adsorption Performance of Coating Film>

The test piece was held in a closed container filled with a sufficient amount of water for 6 hr to measure a change in weight thereof from a dried state. The results were evaluated according to the following ratings.

◯: The maximum adsorption of the coating film was still not less than 95% of a maximum adsorption of the adsorptive particles by themselves.

x: The maximum adsorption of the coating film was less than 95% of a maximum adsorption of the adsorptive particles by themselves.

<Measurement of Pencil Hardness>

The pencil hardness as described in the present invention means the value as measured by the same method as prescribed in JIS K5600-5-4 except for a measuring temperature used therein. In the present invention, three measuring temperatures including 20° C., 100° C. and 150° C. were used in which the temperature condition upon the measurement was set to ±2° C. of the respective measuring temperatures while actually measuring the temperature of the layer. The measurement of the pencil hardness was carried out using a pencil "Uni" (tradename) produced by Mitsubishi Pencil Co., Ltd., in the range of 4H to 6B. When no defects were observed at a hardness of 4H, the layer was evaluated as being "not less than 4H", whereas when defects were observed even at a hardness of 6B, the layer was evaluated as being "less than 6B".

TABLE 1

| | | | Examples | | | | |
|---|---|---|---|---|---|---|---|
| | | | 1 | 2 | 3 | 4 | 5 |
| <Binder> | | | | | | | |
| | Structural unit (a) | Structural unit (b) | | | | | |
| Epoxy resin | | | | | | | |
| EXA4816 | BisA | Linear hydrocarbon | 10 | — | 9 | 5 | — |
| EX4822 | BisA | Polyether chain | — | 10 | — | — | — |
| YL7175-500 | BisF | Linear hydrocarbon | — | — | — | — | 10 |
| YL7162P | BisA | — | — | — | — | 5 | — |
| YL7410 | — | Polyether chain | — | — | — | — | — |
| Reactive diluent | | | | | | | |
| YED216D | — | Linear hydrocarbon | — | — | 1 | — | — |
| Curing agent | | | | | | | |
| DICY | | | 1 | 1 | 1 | 1 | 1 |
| Adsorptive particles | | | | | | | |
| AQSOA Z02 | | | 100 | 100 | 100 | 100 | 100 |
| <Evaluation of performance> | | | | | | | |
| Binder Tg (° C.) | | | 79 | 82 | 63 | 80, 99 | 33 |
| Durability | | | ◯ | ◯ | ◯ | ◯ | ◯ |
| Adsorption capacity | | | ◯ | ◯ | ◯ | ◯ | ◯ |
| Pencil hardness (20° C.) | | | ≥4H | ≥4H | ≥4H | ≥4H | ≥4H |
| Pencil hardness (100° C.) | | | HB | HB | B | HB | 2H |
| Pencil hardness (150° C.) | | | HB | B | B | 5B | HB |

| | | | Comparative Examples | | |
|---|---|---|---|---|---|
| | | | 1 | 2 | 3 |
| <Binder> | | | | | |
| | Structural unit (a) | Structural unit (b) | | | |
| Epoxy resin | | | | | |
| EXA4816 | BisA | Linear hydrocarbon | — | — | — |
| EX4822 | BisA | Polyether chain | — | — | — |
| YL7175-500 | BisF | Linear hydrocarbon | — | — | — |
| YL7162P | BisA | — | 10 | 10 | — |
| YL7410 | — | Polyether chain | — | — | 10 |

TABLE 1-continued

| | | Reactive diluent | | | |
|---|---|---|---|---|---|
| YED216D | — | Linear hydrocarbon Curing agent | — | — | — |
| DICY | | | 1 | — | 1 |
| | | Adsorptive particles | | | |
| AQSOA Z02 | | | 100 | 100 | 100 |
| | | <Evaluation of performance> | | | |
| Binder Tg (° C.) | | | 98 | 52 | −40 |
| Durability | | | X | X | X |
| Adsorption capacity | | | ○ | X | X |
| Pencil hardness (20° C.) | | | ≥4H | ≥4H | <6B |
| Pencil hardness (100° C.) | | | ≥4H | 3H | <6B |
| Pencil hardness (150° C.) | | | ≥4H | <6B | <6B |

As apparently recognized from the results of Table 1, in the adsorptive member of the present invention, the epoxy resin emulsion comprising the structural unit (a) and the structural unit (b) was used as a part or whole of the binder. Only under the above case, the adsorptive member can satisfy both of a good durability and a good adsorption performance.

In any of the above Examples, the pencil hardness of the adsorptive material layer was not less than 4H as measured at 20° C., and less than 4H as measured at 100° C. and 150° C. since the layer was softened at these temperatures. On the other hand, in Comparative Example 1 in which the emulsion comprising no structural unit (b) was used, the pencil hardness of the adsorptive material layer was not less than 4H even when measured at 150° C., which was therefore disadvantageous for reducing a thermal stress in a heat cycle. Also, in Comparative Example 2 in which the binder of Comparative Example 1 was used without being cured, the pencil hardness of the adsorptive material layer was less than 4H as measured at 100° C. and therefore exhibited a sufficient softness. However, the pencil hardness of the adsorptive material layer was less than 6B as measured at 150° C., and therefore it was confirmed that the layer was considerably deteriorated in cohesive force thereof. Further, in Comparative Example 3 in which the emulsion comprising no structural unit (a) was used, the pencil hardness of the adsorptive material layer was less than 6B even as measured at 20° C., and therefore it was confirmed that the layer had a low strength at a near ordinary temperature. The results of measurement of a pencil hardness of the adsorptive material layer had a certain correlation with the results of evaluation of durability thereof.

Production Example 1

Preparation of Honeycomb-Shaped Adsorptive Member

The slurry comprising the adsorptive particles was obtained in the same manner as defined in Example 4. The resulting slurry was further diluted by adding 2 g of ion-exchanged water thereto, and the diluted slurry was poured and flowed over "ALUMICORRUGATE CAL-250" (tradename; cell density: 269 cells/in$^2$) produced by Shin-Nippon Feather Core Co., Ltd. The resulting product was blown with cold air to remove the liquid therefrom, and dried. Further, the coating film on the product was cured at 180° C. for 3 hr to thereby obtain a honeycomb-shaped adsorptive member. By conducting a coating operation only one time, it was possible to form a coating film having a thickness of about 100 μm on an inner wall of each cell. The honeycomb-shaped adsorptive member as described in this Production Example may be used as a dehumidifying desiccant element by passing air therethrough and further may also be used as a heat exchanger for adsorptive heat pumps.

Production Example 2

Preparation of Adsorptive Sheet

Fifty kilograms of zeolite "AQSOA-Z02" (tradename) produced by Mitsubishi Plastics, Inc., and 0.5 kg of powdery sepiolite produced by Omi-Mining Co., Ltd., were dry-blended with each other, and 59 kg of ion-exchanged water were added thereto to prepare a uniform mixture. After removing heat generated upon adsorption of water from the resulting mixture, 5.5 kg of "YL7162P" (tradename) produced by Mitsubishi Chemical Corporation, and 5.5 kg of an emulsion (average particle diameter: 0.5 μm; solid content: 45%) of "EPICLON EXA4816" (tradename) produced by DIC Corp., as binder emulsions, were mixed therein, and further 0.5 kg of adipic acid dihydrazide and 0.5 kg of dicyandiamide as curing agents and 3.2 kg of a urethane-based thickening agent (8 wt % aqueous solution) were added thereto and uniformly mixed therewith, thereby preparing a slurry.

The thus obtained slurry was applied onto both surfaces of a 30 μm-thick aluminum foil base material by a coating method using a roll knife coater (comma coater), and then dried in a drying oven with a temperature gradient in a temperature range of 120 to 160° C.

The thickness of the adsorptive material layer was adjusted to 75 μm (upon drying), thereby obtaining a 150 m-length sheet provided on both surfaces of the 30 μm-thick base material with the 75 μm-thick adsorptive material layer. The thus obtained sheet was wound up into a roll and then cured at 160° C. for 3 hr, thereby obtaining an adsorptive sheet.

As a result, it was confirmed that the thus obtained adsorptive sheet had a pencil hardness of not less than 4H at 20° C., HB at 100° C. and 4B at 150° C., and the adsorptive material layer had a porosity of about 50%. In addition, it was also confirmed that a saturation adsorption of the adsorptive material layer as actually measured was substantially the same as a theoretical saturation adsorption value thereof, and therefore the adsorptive material layer exhibited a sufficient performance of the adsorptive material.

The resulting sheet was also excellent in processability, and had a flexibility capable of withstanding folding and bending at an ordinary temperature or punching.

Production Example 3

Corrugation Process of Adsorptive Sheet

The adsorptive sheet obtained in Production Example 2 was subjected to corrugation process using a one-side corrugated board machine used for processing corrugated boards. The one-side corrugated board machine used above included a corrugating roll (die) with an E flute specification (flute height: about 1.2 mm; number of flutes: 89 flutes/30 cm), and the corrugating roll had a temperature of about 130° C. Although the line speed was as low as not more than 3 m/min, the corrugation process was conducted without sticking of the sheet to the corrugating roll and falling-off of the adsorptive material layer.

The aluminum base material underwent plastic deformation and therefore maintained a wavy shape without adhering to a liner (straight sheet).

The thus obtained corrugated sheets were laminated, and the resulting laminated sheet was formed into a laminated honeycomb. In addition, the laminated sheet was wound up into a roll to obtain a rotor-shaped honeycomb. These honeycombs can be used as an adsorptive member for desiccant air conditioning systems.

Further, when using the above adsorptive member as a fin material for heat exchangers, it is also possible to use the adsorptive member in the applications of adsorptive heat pumps.

The invention claimed is:

1. An adsorptive member comprising a base material and an adsorptive material layer formed on the base material,
    wherein the adsorptive material layer comprises adsorptive particles and a binder as essential components,
    and the binder is an epoxy cured product comprising the following structural units (a) and (b):
    (a): a bisphenol type structural unit; and
    (b): a linear hydrocarbon structural unit having 4 or more carbon atoms, and/or a polyalkylene ether structural unit having 3 or more ether oxygen atoms.

2. The adsorptive member according to claim 1, wherein a glass transition temperature (Tg) of the epoxy cured product lies within a temperature range of the adsorptive member upon use.

3. The adsorptive member according to claim 1, wherein the adsorptive material layer has a pencil hardness of not less than 4H at 20° C., less than 4H at 100° C. and not less than 6B at 150° C.

4. The adsorptive member according to claim 1, wherein the binder further comprises a phenoxy resin.

5. The adsorptive member according to claim 1, wherein the adsorptive particles are formed of at least one material selected from the group consisting of zeolite, silica gel and mesoporous silica.

6. The adsorptive member according to claim 1, wherein the adsorptive particles are formed of zeolite comprising a material selected from the group consisting of an aluminosilicate and an aluminophosphate, or zeolite comprising combination of any two or more thereof.

7. The adsorptive member according to claim 1, wherein the adsorptive particles have a change in adsorption of not less than 0.10 g/g when a change in relative vapor pressure is 0.15 in a relative vapor pressure range of not less than 0.01 and not more than 0.5 in a water vapor adsorption isotherm curve as measured at 25° C.

8. The adsorptive member according to claim 1, wherein the base material is in the form of at least one selected from the group consisting of a plate, a tube, a honeycomb, a sheet, a net and a nonwoven fabric.

9. The adsorptive member according to claim 1, wherein the base material is at least one material selected from the group consisting of metals, ceramic materials and inorganic fibers.

10. The adsorptive member according to claim 1, wherein the adsorptive material layer is formed by
    applying a slurry comprising at least the adsorptive particles and an aqueous emulsion of the following specific epoxy resin, and a curing agent, onto the base material, and then drying and
    curing the slurry thus applied;
    wherein said epoxy resin is
    an epoxy resin comprising the following structural units (a) and (b),
    a combination of an epoxy resin comprising at least one of the following structural units (a) and (b) and an epoxy resin comprising at least the other of the following structural units (a) and (b), or
    a combination of an epoxy resin comprising the following structural unit (a) and a chain extender capable of adding the following structural unit (b) to the epoxy resin by reacting with the epoxy resin;
    wherein the structural unit (a) is a bisphenol type structural unit and the structural unit (b) is a linear hydrocarbon structural unit having 4 or more carbon atoms and/or a polyalkylene ether structural unit having 3 or more ether oxygen atoms.

11. A heat exchanger comprising the adsorptive member as defined in claim 1.

12. An adsorptive heat pump comprising the heat exchanger as defined in claim 11.

13. A warm water and/or cold water production apparatus comprising the adsorptive heat pump as defined in claim 12.

14. A humidity control apparatus comprising the adsorptive member as defined in claim 1.

15. The humidity control apparatus according to claim 14, wherein the apparatus is a desiccant rotor.

* * * * *